United States Patent
Gere

(10) Patent No.: US 9,719,551 B2
(45) Date of Patent: Aug. 1, 2017

(54) INJECTION-MOLDED ROOFING MEMBRANE PLATE

(71) Applicant: Duro-Last, Inc., Saginaw, MI (US)

(72) Inventor: Keith Allan Gere, Frankenmuth, MI (US)

(73) Assignee: Duro-Last, Inc., Saginaw, MI (US)

( * ) Notice: Subject to any disclaimer, the term of this patent is extended or adjusted under 35 U.S.C. 154(b) by 0 days.

(21) Appl. No.: 14/684,833

(22) Filed: Apr. 13, 2015

(65) Prior Publication Data

US 2015/0292547 A1  Oct. 15, 2015

Related U.S. Application Data

(60) Provisional application No. 61/979,561, filed on Apr. 15, 2014.

(51) Int. Cl.
*F16B 43/00* (2006.01)
*E04D 5/14* (2006.01)

(52) U.S. Cl.
CPC .............. *F16B 43/00* (2013.01); *E04D 5/145* (2013.01)

(58) Field of Classification Search
CPC .. F16B 43/00; F16B 2043/008; E04D 3/3601; E04D 3/3602; E04D 3/3603; E04D 3/3605; E04D 3/3607; E04D 5/145; E04D 5/147
USPC .......................................... 411/531, 538, 546
See application file for complete search history.

(56) References Cited

U.S. PATENT DOCUMENTS

| | | | | |
|---|---|---|---|---|
| 4,476,660 A | * | 10/1984 | Francovitch | E04D 5/145 405/259.1 |
| 4,630,422 A | * | 12/1986 | Beneze | E04D 5/145 411/369 |
| 4,987,714 A | * | 1/1991 | Lemke | E04D 3/3603 411/369 |
| 4,999,963 A | * | 3/1991 | Verble | E04D 5/143 52/410 |
| 5,934,855 A | * | 8/1999 | Osterle | E04D 3/3603 405/302.1 |
| 6,250,034 B1 | * | 6/2001 | Hulsey | E04D 3/3603 411/545 |
| 6,282,857 B1 | * | 9/2001 | Rubenacker | F16B 43/02 411/531 |
| 6,665,991 B2 | * | 12/2003 | Hasan | E04D 5/14 411/466 |
| 6,722,095 B2 | * | 4/2004 | Kobetsky | E04D 5/14 411/462 |
| 7,631,468 B2 | * | 12/2009 | Gong | E04D 5/145 411/162 |
| D636,503 S | * | 4/2011 | Parziale | D25/199 |
| 9,309,915 B1 | * | 4/2016 | Rodenhouse | F16B 43/00 |

* cited by examiner

*Primary Examiner* — Roberta Delisle
(74) *Attorney, Agent, or Firm* — Reising Ethington P.C.

(57) ABSTRACT

An injection-molded plastic roofing membrane plate includes a body and multiple cleats. The cleats extend from a bottom surface of the body. Each of the cleats has a rounded terminal end with a rounded terminal surface. The rounded terminal surfaces make surface-to-surface abutment with an underlying membrane in installation. The rounded terminal surfaces reduce wear on the underlying membrane that may otherwise occur.

6 Claims, 3 Drawing Sheets

INJECTION-MOLDED ROOFING MEMBRANE PLATE

CROSS-REFERENCE TO RELATED APPLICATION

This application claims the benefit of U.S. Provisional Patent Application No. 61/979,561, filed on Apr. 15, 2014, the entire contents of which are hereby incorporated by reference.

TECHNICAL FIELD

The present disclosure generally relates to roofing installations, and more particularly relates to membrane plates for securing membranes in roofing installations.

BACKGROUND

In roofing installations, membranes are laid on top of substrates such as roofs. The membranes are secured over the substrates by membrane plates set down over the membranes. A fastener passes through the membrane plates, is driven through the membranes, and is driven into the substrates below for securing the membrane plates on the membranes. The membrane plates are also referred to as stress plates or clamping plates, and are commonly made of metal. Sometimes, small protrusions project downwardly from the membrane plates for direct contact with the membranes underneath. And in some installations, insulation is inserted between the membranes and substrates.

SUMMARY

In one embodiment, an injection-molded plastic roofing membrane plate includes a body and multiple cleats extending from a bottom surface of the body. Each of the cleats has a rounded terminal end with a rounded terminal surface. In installation, the rounded terminal surfaces make surface-to-surface abutment with an underlying membrane. By their structure, the rounded terminal surfaces minimize wear on the underlying membrane caused by the cleats.

In another embodiment, a method of manufacturing a plastic roofing membrane plate involves injection molding. When injection molded, the plastic roofing membrane plate has a body and multiple cleats extending from the body. The body has a single bore defined therethrough, and has a tapered thickness dimension narrowed in dimension toward a periphery of the body. Each of the cleats has a rounded terminal end, has a tapered portion that spans from the rounded terminal end, and has a base portion that spans from the tapered portion. The base portion has a substantially uniform dimension throughout its extent.

In yet another embodiment, an injection-molded one-piece plastic roofing membrane plate includes a body and multiple cleats. The body has a bore defined therethrough that receives a fastener in installation. The body also has a peripheral region that is narrowed in dimension toward a periphery of the body. The cleats span unitarily from the body at a bottom surface of the body. Each of the cleats has a rounded terminal end with a rounded terminal surface. The rounded terminal surface makes surface-to-surface abutment with an underlying membrane in installation. Each of the cleats has a tapered portion that spans generally from the rounded terminal end. The tapered portion narrows in dimension toward the rounded terminal end. And each of the cleats has a base portion that spans generally from the bottom surface of the body and spans generally to the tapered portion. The base portion has a substantially uniform dimension throughout its extent from the bottom surface and to the tapered portion. The term substantially as used herein is meant to account for manufacturing tolerances that may be introduced via an injection molding process.

DETAILED DESCRIPTION OF THE PREFERRED EMBODIMENTS

The figures illustrate one embodiment of a roofing membrane plate 10 that is installed in roof constructions. The roofing membrane plate 10 sets down over a membrane and secures the membrane on top of an underlying substrate like a roof. Insulation can optionally be inserted between the membrane and roof. The secured membrane can be a single-ply membrane composed of a thermoplastic material such as a flexible polyvinylchloride (PVC) material having a weft-inserted polyester scrim; these types of membranes are supplied by Duro-Last Roofing, Inc. of Saginaw, Mich. U.S.A. Still, other membranes are possible including one composed of a different material and supplied by a different company. Compared to previously-known plates, the roofing membrane plate 10 can be manufactured easily and at a low cost, and exhibits reduced wear and tear on the underlying membrane in installation. While illustrated by one embodiment in the figures, the roofing membrane plate 10 can have different designs and constructions in other embodiments, some of which are described below. Indeed, its exact design and construction may depend on the particular application including the particular roofing installation.

Figure 1:
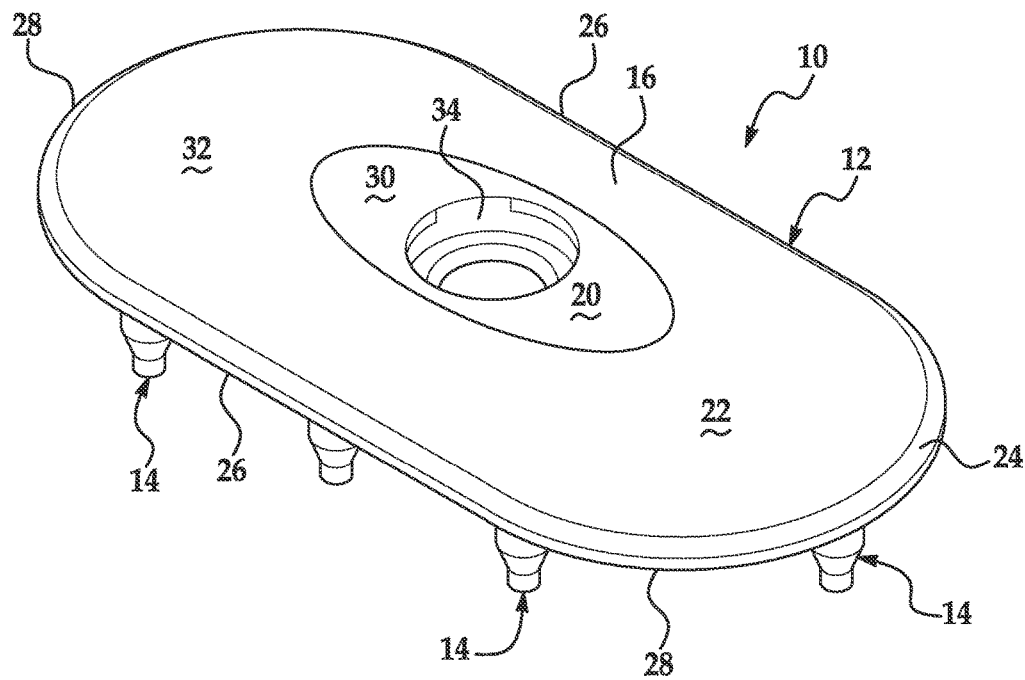
FIG. 1 is a perspective view of an embodiment of a roofing membrane plate.
Figure 2:
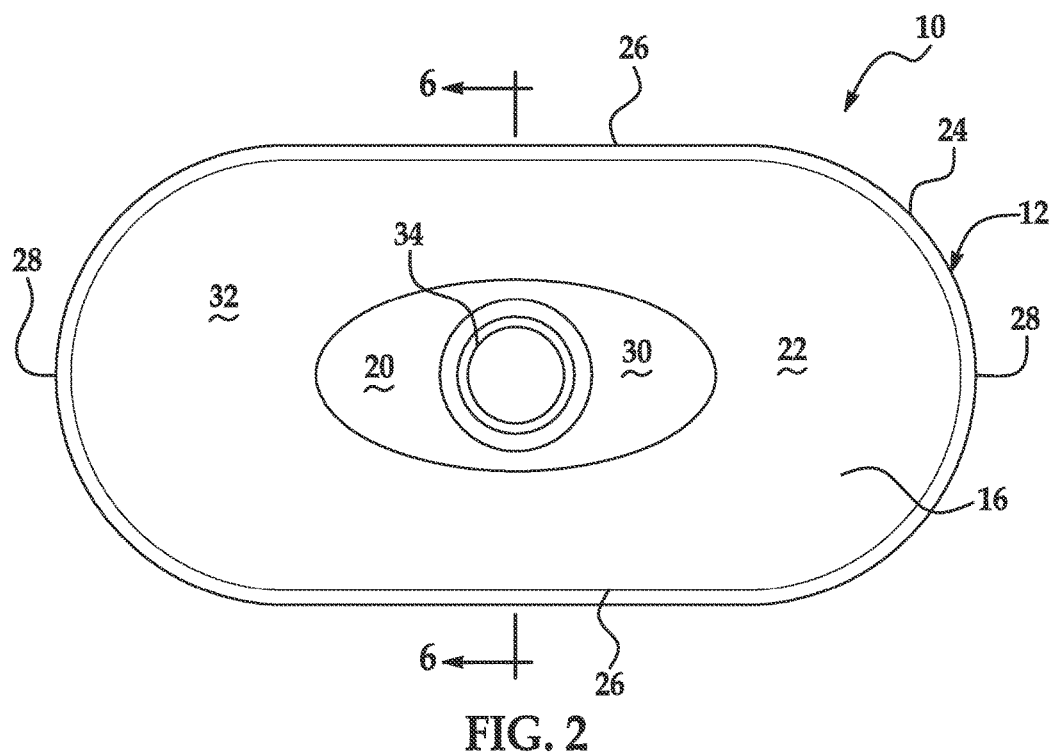
FIG. 2 is a top view of the roofing membrane plate of FIG. 1.
Figure 3:
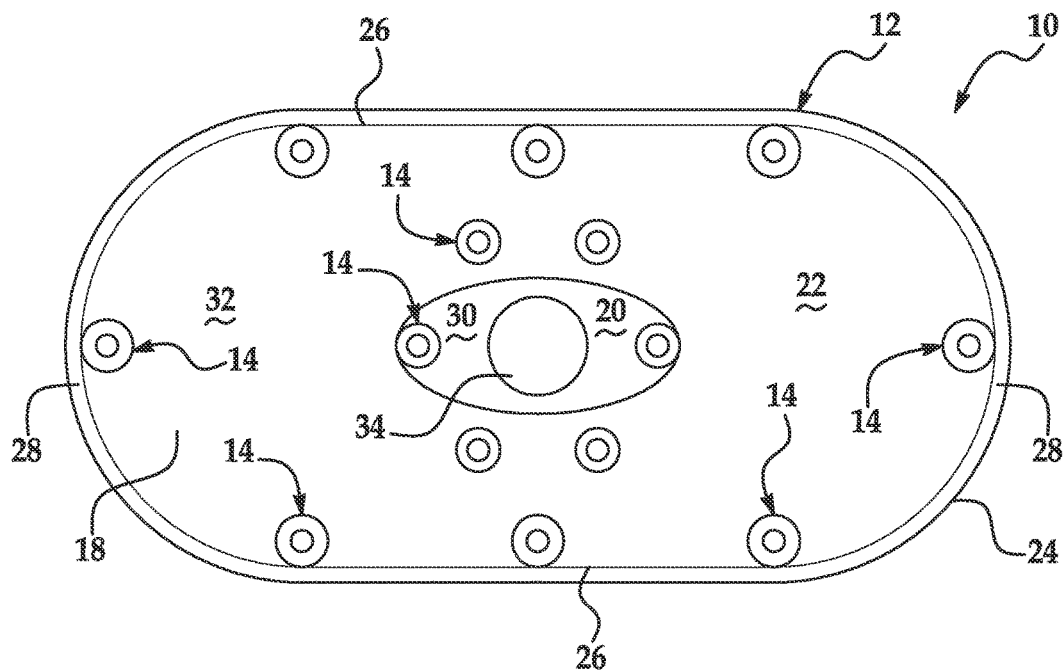
FIG. 3 is a bottom view of the roofing membrane plate of FIG. 1.
Figure 4:
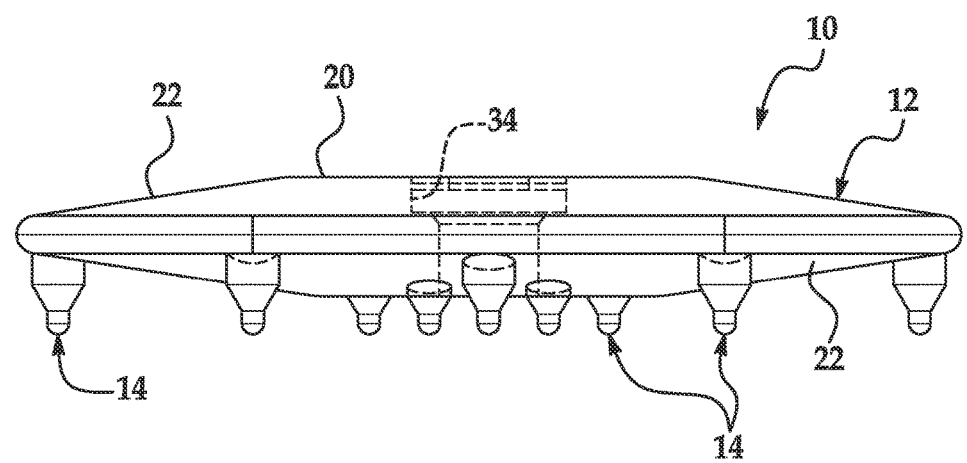
FIG. 4 is a front view of the roofing membrane plate of FIG. 1.
Figure 5:
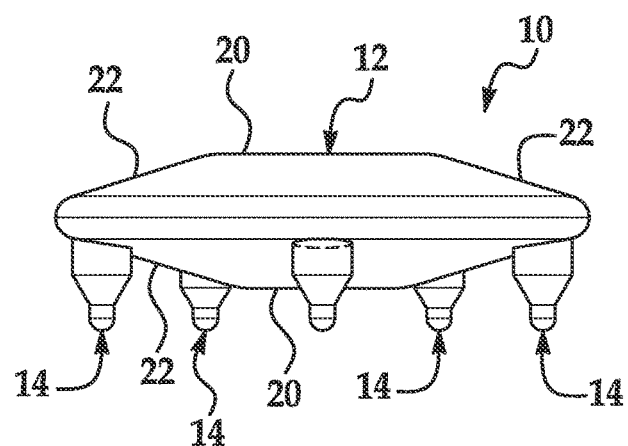
FIG. 5 is a side view of the roofing membrane plate of FIG. 1.
Figure 6:
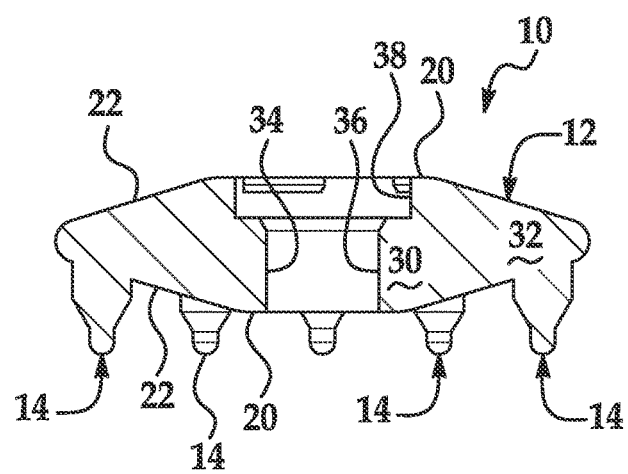
FIG. 6 is a sectional view of the roofing membrane plate taken at 6-6 in FIG. 2.

Referring to FIGS. 1-3, the roofing membrane plate 10 is made of a single unitary piece and is composed of a plastic material. One example plastic material is a glass-filled polycarbonate blend which has been shown to demonstrate suitable weatherability and durability in use. Because it is composed of a plastic material, the roofing membrane plate 10 can be manufactured by an injection molding process. Injection molding is a cost effective means of fabrication.

The roofing membrane plate 10 presented in the figures has a body 12 and multiple cleats 14 unitarily extending downward from the body. Referring to FIGS. 1-5, the body 12 has a generally oval and saucer-like overall shape. The oval's major axis is greater than its minor axis, and in this sense the body 12 is narrow in shape along its major axis. The body 12 has a top surface 16 and a bottom surface 18, both of which have planar and sloped sections 20, 22. The planar sections 20 are generally oriented parallel with a horizontal plane defined by the underlying membrane, while the sloped sections 22 slant at an angle from the planar sections and at an angle with the horizontal (this is perhaps best illustrated in FIGS. 4 and 5, and the term horizontal as used herein is relative to the underlying membrane). Following its oval shape, the body 12 has a periphery 24. The periphery 24 is made up of geometrically linear sides 26 and arced sides 28.

The body's structure includes a central region 30 and a peripheral region 32. The central region 30 has an oval shape with a uniform thickness dimension measured vertically between planar sections 20 of the top and bottom surfaces 16, 18. The peripheral region 32 spans from all sides of the central region 30 and, unlike the central region, has a tapering thickness dimension measured vertically between sloped sections 22 of the top and bottom surfaces 16, 18. As perhaps illustrated best by FIGS. 4 and 5, the tapered thickness narrows in dimension from the central region 30 toward the periphery 24. In other words, the sloped sections 22 converge toward each other horizontally outwardly as they approach the periphery 24. The body's shape and construction—particularly its uniform central region and tapered peripheral region—imparts the structural integrity and strength to endure forces and stresses it experiences when the body 12 is installed and in use. In other embodiments though, the body need not necessarily have the uniform central region and tapered peripheral region, and may still suitably endure forces and stresses in use. The sloped and tapered peripheral region may also facilitate injection molding by providing draft geometry.

For securing the roofing membrane plate 10 on top of the underlying membrane, a fastener (not shown) is inserted through a single bore 34 defined completely through the body 12 from the top surface 16 to the bottom surface 18. The fastener can be a nail, bolt, or screw. Referring now to FIGS. 1-3 and 6, the bore 34 is positioned in the middle of the body 12 at the central region 30 and creates a void in the uniform thickness at that region. The bore 34 has a main section 36 to receive the shank of the fastener, and has a counterbore section 38 to receive the head of the fastener so that the head can be set flush with the top surface 16.

The cleats 14 serve as legs for the roofing membrane plate 10 and support the body 12 in installation. The cleats 14 are unitary extensions of the body 12 that project vertically downward from the bottom surface 18. They are formed in the same injection molding process as the body 12 and are not stamped with opened hinges as in previously-known plates. When installed and in use, the cleats 14 make direct surface-to-surface abutment with the underlying membrane, while the body 12 remains spaced slightly above the membrane via the cleats. In the embodiment of the figures, and referring particularly to FIG. 3, the roofing membrane plate 10 has a total of fourteen individual cleats 14 located away from one another on the bottom surface 18 and somewhat symmetrically distributed on the bottom surface. Their symmetrical distribution resists uplift pressures during use of the roofing membrane plate 10 in a likewise symmetrical fashion. Eight cleats 14 are positioned near the periphery 24, with six of the eight at the linear sides 26 and one at each arced side 28. These eight are vertically longer and have larger bases than the other six. The other six cleats 14 are positioned near the central region 30 in a circular arrangement around the bore 34. Compared to the eight near the periphery 24, these six are vertically shorter and have smaller bases—this way, all fourteen of the cleats 14 extend to the same vertical distance below the bottom surface 18.

Figure 7:
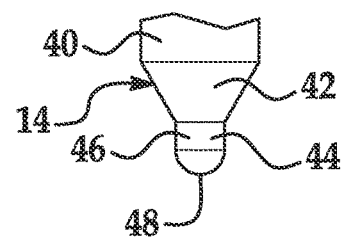
FIG. 7 is an enlarged view of an embodiment of a cleat of the roofing membrane plate of FIG. 1.

Referring now to FIG. 7, each individual cleat 14 has a base portion 40, a tapered portion 42, and a rounded terminal end 44. The base portion 40 spans immediately from the bottom surface 18 and to the tapered portion 42. The base portion 40 has a cylindrical and column-like shape with a substantially uniform dimension (in this example, a uniform diameter) throughout its full extent. Further, the tapered portion 42 spans immediately from the base portion 40 and to the rounded terminal end 44. The tapered portion 42 is at a midsection of an individual cleat 14. It narrows in dimension (in this example, diameter) along its extent from the base portion 40 and to the rounded terminal end 44. Taken in isolation, the tapered portion 42 has a frusto-conical shape. The tapered portion 42 can facilitate injection molding by providing draft geometry.

Still referring to the individual cleat 14 in FIG. 7, the rounded terminal end 44 spans immediately from the tapered portion 42 and constitutes the free end portion of the cleat. As illustrated, the rounded terminal end 44 can include a cylindrical and column-like section 46 of a smaller dimension than the base portion 40. A rounded terminal surface 48 is provided at the bottom of the rounded terminal end 44. The rounded terminal surface 48 presents a ball-like blunted nose at the end of the cleat 14, and can define a radius of curvature of approximately 0.03 inches (0.762 millimeters) in one specific example. Other values for the radius of curvature are possible.

When installed and in use, the roofing membrane plate 10 properly secures the underlying membrane on top of the roof, and without wearing and tearing and possibly puncturing the membrane as in previously-known plates. Uplift forces are exerted to the fastened roofing membrane plate 10 by, in some instances, wind hitting the roof. The uplift forces cause at least some of the stresses experienced by the roofing membrane plate 10. Also, the uplift forces create uplift pressure to the cleats 14, and consequential rubbing and other movement takes place between the cleats and membrane. If too sharp, the cleats can wear, tear, and even puncture the membrane; likewise, excessive pressure can cause wearing, tearing, and puncturing. The cleats 14 detailed in this description have been designed to properly secure the membrane over the roof, while limiting or altogether preventing the wear, tear, and puncture that can occur in some previously-known plates. The improved securement and absence of past shortcomings is due in part or more to the design and construction of the cleats 14, and to the design and construction of the rounded terminal end 44.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. An injection-molded plastic roofing membrane plate, comprising:
   a body;
   wherein said body has a bore defined therethrough, said bore constructed for receiving a fastener;
   wherein said body has a central region with a substantially uniform thickness dimension, and said body has a peripheral region spanning from said central region and having a tapered thickness dimension narrowed in dimension toward a periphery of said body; and
   a plurality of cleats extending from a bottom surface of said body, each of said plurality of cleats having a rounded terminal end with a rounded terminal surface, said rounded terminal surfaces making surface-to-surface abutment with an underlying membrane in installation and at least reducing wear on the underlying membrane via said plurality of cleats.

2. The injection-molded plastic roofing membrane plate of claim 1, wherein each of said plurality of cleats has a tapered portion spanning from said rounded terminal end, said tapered portion narrowing in dimension toward said rounded terminal end.

3. The injection-molded plastic roofing membrane plate of claim 2, wherein each of said plurality of cleats has a base portion spanning from the bottom surface of said body to said tapered portion, said base portion having a substantially uniform dimension throughout its extent from the bottom surface to said tapered portion.

4. The injection-molded plastic roofing membrane plate of claim 1, wherein each of said plurality of cleats extend unitarily from said body at the bottom surface and are free of a hinge thereat.

5. A method of manufacturing a plastic roofing membrane plate, the method comprising:
   injection molding the plastic roofing membrane plate to have a body and a plurality of cleats extending from said body, said body having a single bore defined therethrough and having a tapered thickness dimension narrowed in dimension toward a periphery of said body, each of said plurality of cleats having a rounded terminal end, having a tapered portion spanning from said rounded terminal end, and having a base portion spanning from said tapered portion that has a substantially uniform dimension throughout its extent.

6. An injection-molded one-piece plastic roofing membrane plate, comprising:
   a body having a bore defined therethrough for receiving a fastener, said body having a peripheral region that is narrowed in dimension toward a periphery of said body; and
   a plurality of cleats spanning unitarily from said body at a bottom surface of said body, each of said plurality of cleats having a rounded terminal end with a rounded terminal surface, said rounded terminal surfaces making surface-to-surface abutment with an underlying membrane in installation, each of said plurality of cleats having a tapered portion spanning generally from said rounded terminal end, said tapered portion narrowing in dimension toward said rounded terminal end, and each of said plurality of cleats having a base portion spanning generally from the bottom surface of said body and generally to said tapered portion, said base portion having a substantially uniform dimension throughout its extent from the bottom surface and to said tapered portion.

\* \* \* \* \*